United States Patent
Betcher et al.

(10) Patent No.: US 11,571,641 B2
(45) Date of Patent: Feb. 7, 2023

(54) FUEL FILTER WITH COALESCER

(71) Applicant: Donaldson Company, Inc., Minneapolis, MN (US)

(72) Inventors: Scott A. Betcher, Lakeville, MN (US); Kenneth P. Skaja, Andover, MN (US); Paul R. Hennen, Coon Rapids, MN (US); Gwenolé Stouthuysen, Glabbeek (BE); Brian Tucker, Farmington, MN (US); David B. Harder, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 74 days.

(21) Appl. No.: 16/978,150

(22) PCT Filed: Mar. 8, 2019

(86) PCT No.: PCT/US2019/021384
§ 371 (c)(1),
(2) Date: Sep. 3, 2020

(87) PCT Pub. No.: WO2019/173736
PCT Pub. Date: Sep. 12, 2019

(65) Prior Publication Data
US 2020/0406169 A1    Dec. 31, 2020

Related U.S. Application Data

(60) Provisional application No. 62/796,922, filed on Jan. 25, 2019, provisional application No. 62/640,994, filed on Mar. 9, 2018.

(51) Int. Cl.
*B01D 27/14* (2006.01)
*B01D 27/06* (2006.01)
(Continued)

(52) U.S. Cl.
CPC ........... *B01D 27/148* (2013.01); *B01D 27/06* (2013.01); *B01D 27/08* (2013.01); *B01D 29/21* (2013.01);
(Continued)

(58) Field of Classification Search
CPC ...... B01D 27/148; B01D 27/06; B01D 27/08; B01D 29/21; B01D 29/58; B01D 35/30;
(Continued)

(56) References Cited

U.S. PATENT DOCUMENTS

| | | | |
|---|---|---|---|
| 4,257,890 | A | 3/1981 | Hurner |
| 6,716,349 | B2 | 4/2004 | Baracchi et al. |
| 9,546,626 | B2 | 1/2017 | LaForge |
| 9,604,167 | B2 | 3/2017 | Popoff et al. |

(Continued)

FOREIGN PATENT DOCUMENTS

| | | | | |
|---|---|---|---|---|
| DE | 102011003645 A1 * | 8/2012 | ............. | B01D 29/58 |
| DE | 102011003645 A1 | 8/2012 | | |

(Continued)

OTHER PUBLICATIONS

International Search Report and Written Opinion for PCT/US2019/021384, dated May 14, 2019.

*Primary Examiner* — Waqaas Ali
(74) *Attorney, Agent, or Firm* — Merchant & Gould P.C.

(57) ABSTRACT

A filter element, for use filtering liquids such as fuel, includes a first section of filter media, an optional layer of coalescer media, and a section of barrier media. The first section and optional coalescer filter media are held between opposite first and second end caps. The second end cap is integrated with the barrier filter media. The barrier media extends at least part way into an interior of the first section and can be conical in shape.

20 Claims, 10 Drawing Sheets

(51) Int. Cl.
*B01D 27/08* (2006.01)
*B01D 29/21* (2006.01)
*B01D 29/58* (2006.01)
*B01D 35/30* (2006.01)
*B01D 36/00* (2006.01)

(52) U.S. Cl.
CPC .............. *B01D 29/58* (2013.01); *B01D 35/30* (2013.01); *B01D 36/003* (2013.01); *B01D 2201/02* (2013.01); *B01D 2201/295* (2013.01); *B01D 2201/347* (2013.01); *B01D 2201/4092* (2013.01)

(58) Field of Classification Search
CPC .............. B01D 36/003; B01D 2201/02; B01D 2201/295; B01D 2201/347; B01D 2201/4092; B01D 35/005
See application file for complete search history.

(56) References Cited

U.S. PATENT DOCUMENTS

| | | |
|---|---|---|
| 9,670,888 B2 | 6/2017 | Jiang et al. |
| 10,315,140 B2 | 6/2019 | Hauser et al. |
| 2013/0153487 A1* | 6/2013 | Terry .................... F02M 37/32 210/418 |
| 2014/0251889 A1 | 9/2014 | LaForge |
| 2014/0284268 A1 | 9/2014 | Volkmer |
| 2015/0122720 A1 | 5/2015 | Boiger et al. |
| 2016/0082370 A1* | 3/2016 | Morris ................... F02M 37/34 210/442 |
| 2016/0265496 A1 | 9/2016 | Baumann et al. |

FOREIGN PATENT DOCUMENTS

| | | | |
|---|---|---|---|
| EP | 2664371 A1 | 11/2013 | |
| EP | 3175899 A1 * | 6/2017 | ........... B01D 17/045 |
| WO | WO-2019014211 A1 * | 1/2019 | ........... B01D 17/045 |

* cited by examiner

FUEL FILTER WITH COALESCER

This application is a US National Stage application of PCT International Patent application No. PCT/US2019/021384, filed Mar. 8, 2019, claims the benefit of priority to U.S. Provisional patent application Ser. Nos. 62/640,994, filed Mar. 9, 2018, and 62/796,922, filed Jan. 25, 2019 which applications are incorporated herein by reference. To the extent appropriate, a claim of priority is made to each of the above disclosed applications.

TECHNICAL FIELD

This disclosure relates to a filter element useful for a variety of engine applications, and in particular, for fuel. More specifically, this disclosure concerns a filter element including an integrated coalescer filter.

BACKGROUND

Fuel filter systems commonly use a disposable filter cartridge which is replaced at pre-established intervals of filter usage. The filter element may be used to filter a fluid comprising liquid and impurities. For example, the filter is often used to remove water from a liquid fuel to avoid damage to moisture-sensitive components, such as fuel injection equipment. Improvements over the prior art of such liquid filter systems, especially fuel systems are desirable.

SUMMARY

A filter element is provided that improves the prior art.

In one aspect, a filter element is provided including a housing; a first section of filter media within the housing; a first end cap secured to first section; and a second end cap at an opposite end of the filter element from the first endcap. The first section is secured to the second end cap and extends between the first and second end caps. The second end cap includes a barrier filter media extending into the interior volume of the first section of filter media. The barrier filter media is spaced from the first section of filter media and forms a tube shape.

The barrier filter media can extend from the second end cap into the interior volume not more than partway toward the first end cap.

The barrier filter media may have an open end at the second end cap and an opposite closed end.

The barrier media can be conically shaped and be larger at the open end than at the closed end.

The barrier media may include a plurality of support ribs extending longitudinally between the open end and the closed end.

The barrier media is typically free of cross ribs extending along a circumference of the barrier media.

In many examples, the first section of filter media is pleated media.

In many examples, the first end cap has a central opening in communication with the interior volume.

In example embodiments, the second end cap has a central opening in communication with the interior volume.

In example implementations, the surrounding wall is permanently secured to the first end cap.

In many applications, there is a seal member between the first end cap and the surrounding wall.

In many examples, the first end cap includes an internally directed section of threads.

In example embodiments, the second end cap is within the surrounding wall and includes portions radially spaced from the surrounding wall.

In many examples, the first section of filter media is pleated and has outer pleat tips and inner pleat tips; and the second end cap includes a seal member outside the interior volume and radially spaced from the outer pleat tips.

In many examples, the second end cap seal member is radially spaced from the inner pleat tips.

The second end cap seal member can be spaced between the outer pleat tips and inner pleat tips.

In many examples, the filter element further includes a sleeve secured to an exterior of the surrounding wall, adjacent the second end cap, and holding a gasket member.

In examples that include a sleeve secured to the surrounding wall, the sleeve can include a threaded section.

In example implementations, the surrounding wall has a first end adjacent the first end cap and an opposite end adjacent the second end cap; the sleeve includes a second end adjacent the second end of the surrounding wall and an opposite first end spaced only part way along the surrounding wall toward the first end of the surrounding wall; and the sleeve threaded section is axially between the first end of the sleeve and the gasket.

In example embodiments, the barrier media extends from the second end cap into the interior volume between 40-70% of a length of the first section of filter media toward the first end cap.

It is noted that not all the specific features described herein need to be incorporated in an arrangement for the arrangement to have some selected advantage according to the present disclosure.

DETAILED DESCRIPTION

Figure 1:
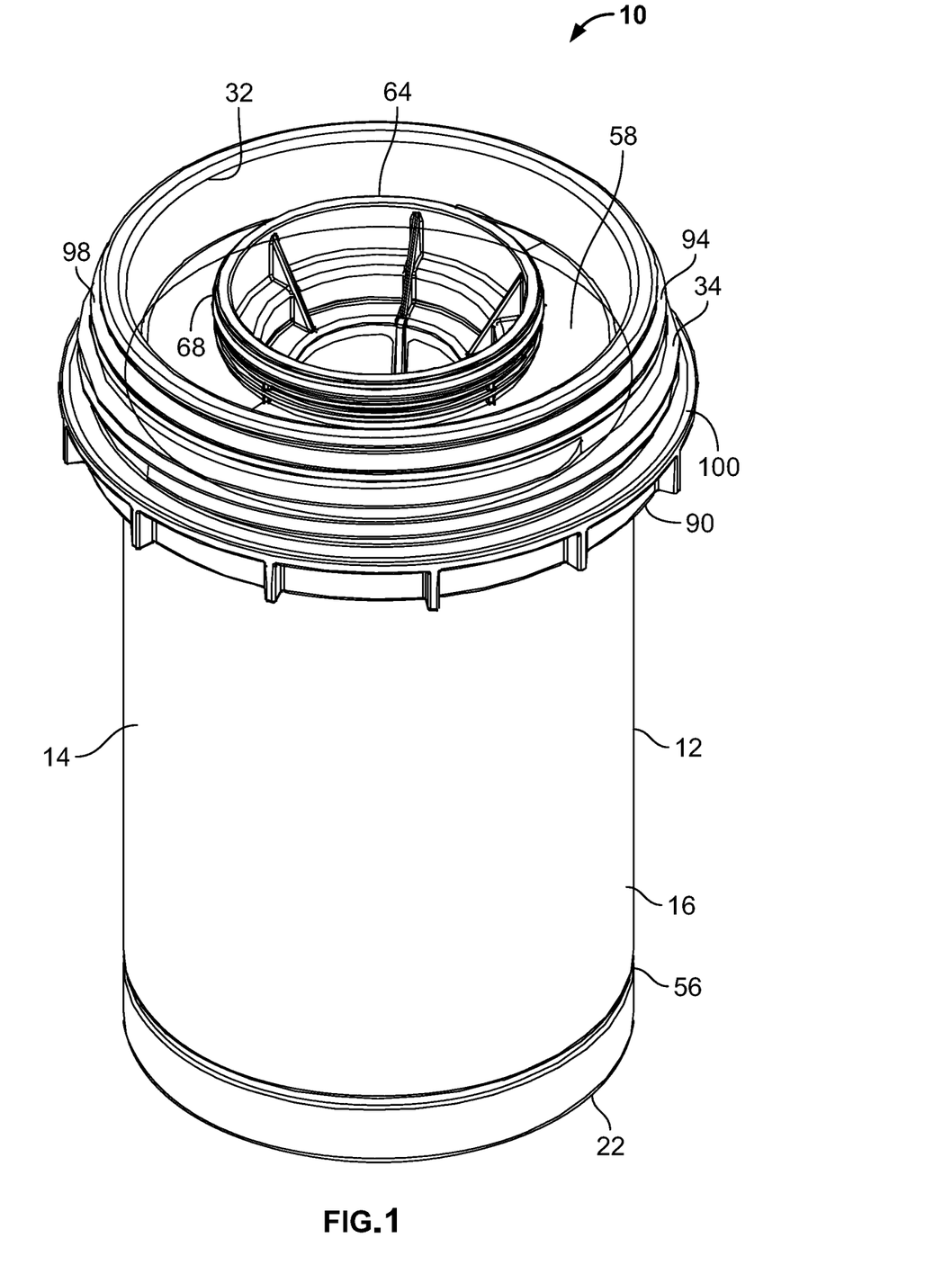
FIG. 1 is a perspective view of one embodiment of a filter element constructed in accordance with principles of this disclosure.
Figure 2:
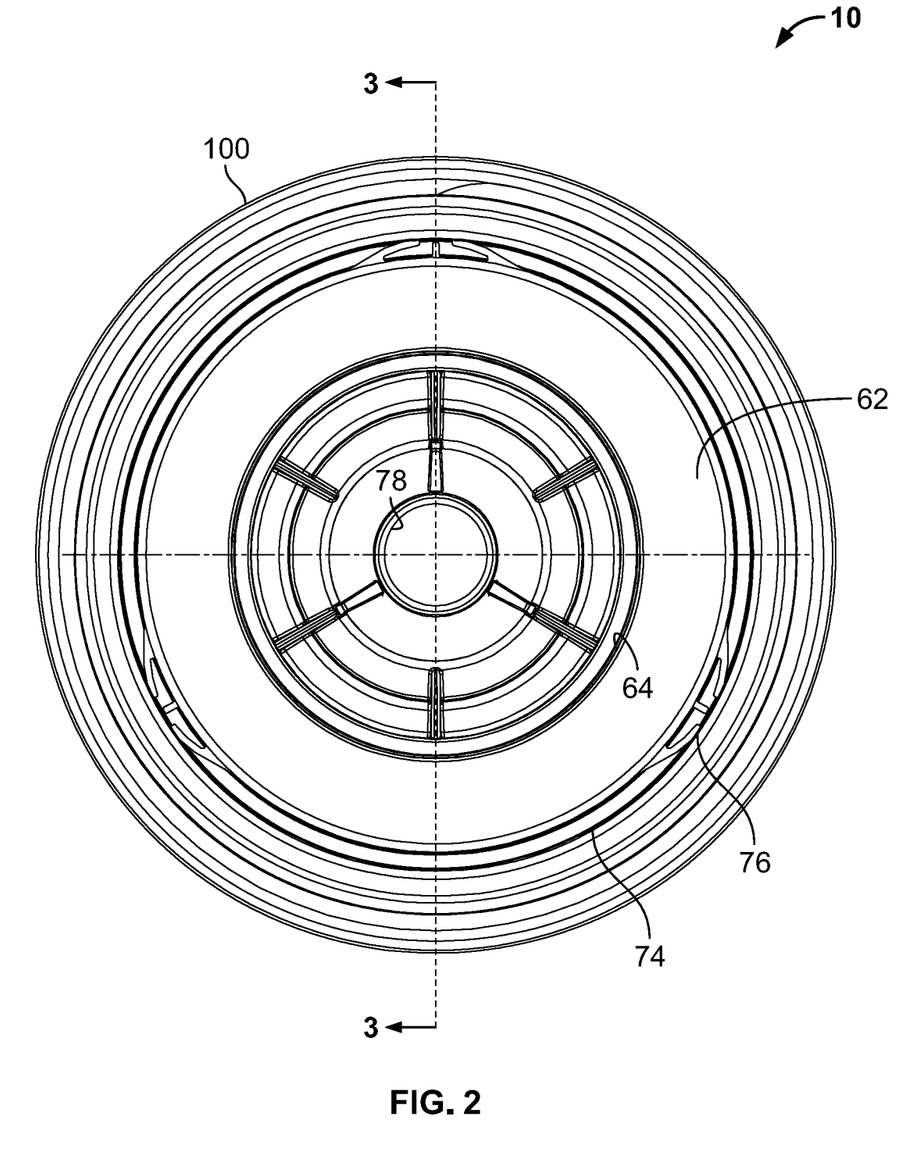
FIG. 2 is a top view of the filter element of FIG. 1.
Figure 3:
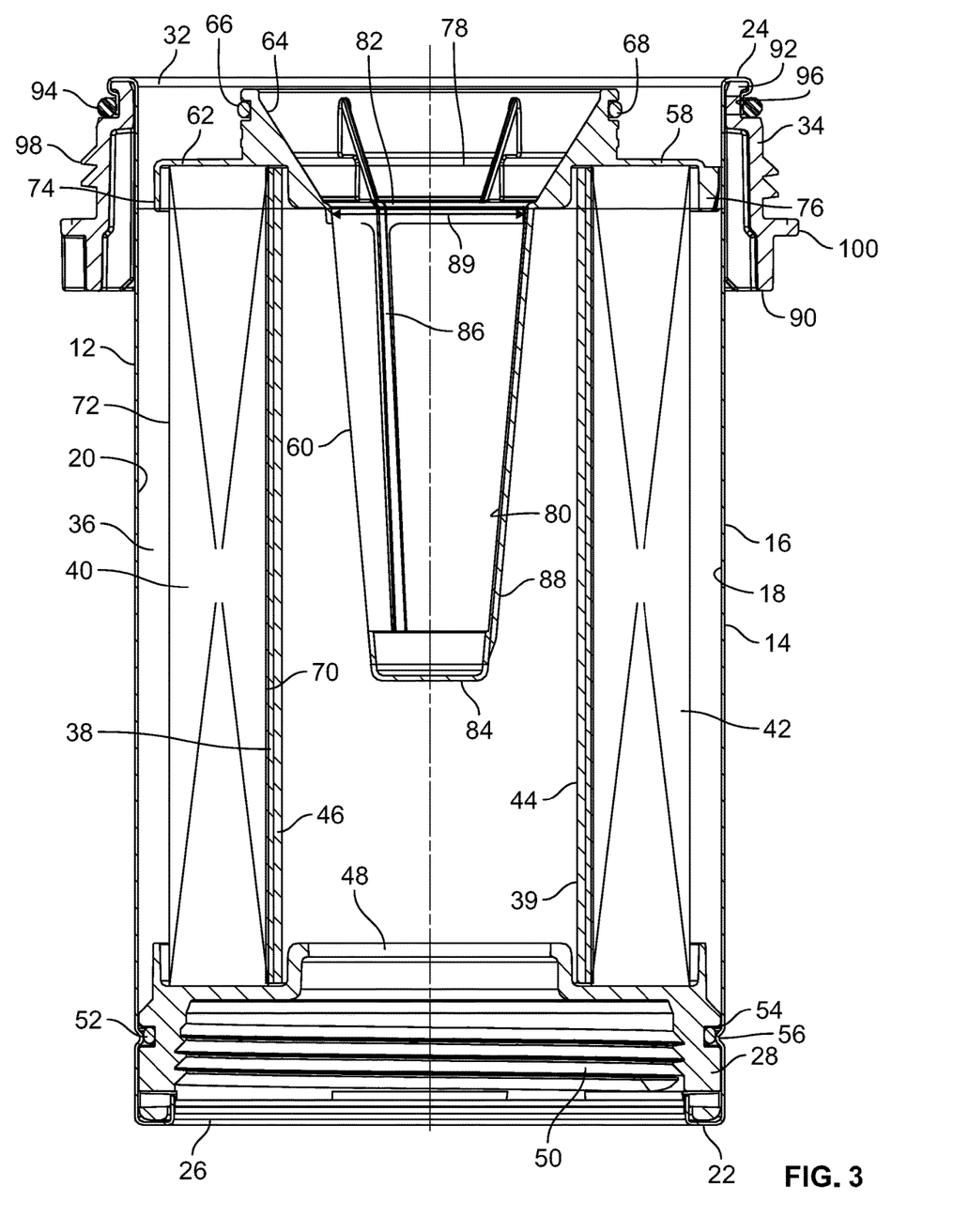
FIG. 3 is a cross-sectional view of the filter element of FIG. 1, the cross section being taken along the line 3-3 of FIG. 2.
Figure 8:
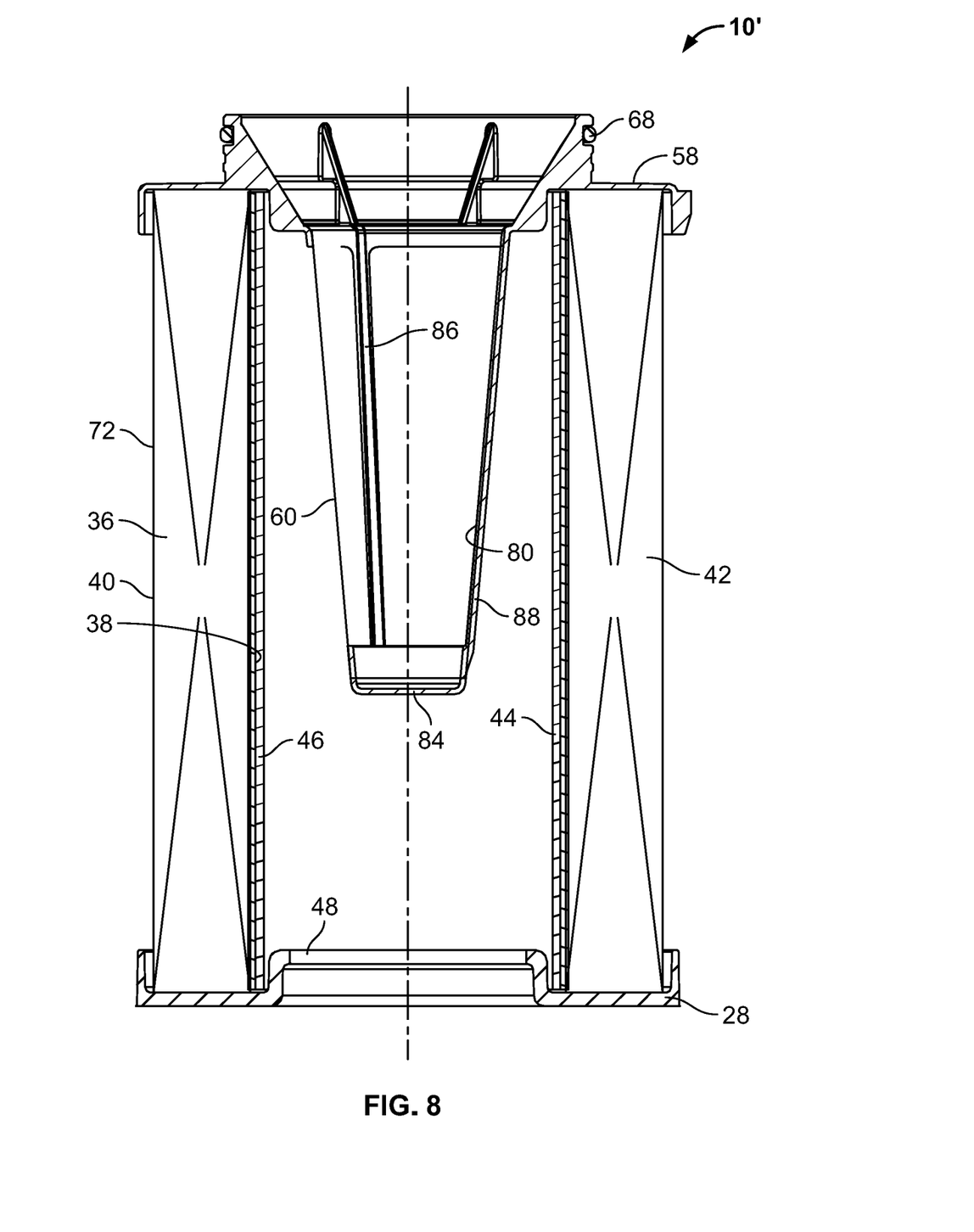
FIG. 8 is a cross-sectional view of a filter element usable in a bowl-cartridge assembly.

A filter element useful for filtering engine fluids, such as fuel, is depicted in FIG. 1 at 10. The filter element 10 will typically be removably secured to a filter head (not shown). Fluid to be filtered will flow through the filter head, into the filter element 10, out of the filter element 10 and back into the filter head, in which it then flows to downstream equipment. The filter element 10 of FIGS. 1-3 is usable as part of a spin-on filter assembly, in which the entire element 10, including an inner media and outside housing, is removable from the filter head and replaced with a new one when the media is clogged or at the end of the usual service life. The element 10 is not removable from the outer housing. This type of arrangement can be contrasted with a bowl-cartridge assembly, in which only the internal components of the filter media are replaced. FIG. 8 is an illustration of the element 10' as part of a bowl-cartridge assembly. The element 10' is removable and replaceable from its outer housing (bowl) (not illustrated). The outer housing (bowl), with the removable and replaceable element 10' within it, is removably securable to a filter head (not shown).

FIG. 2 is a top view of the filter element 10, and FIG. 3 is a cross-sectional view through the filter element 10, as depicted at 3-3 of FIG. 2. In reference now to FIG. 3, the filter element 10 includes a housing 12. The housing 12 has a surrounding wall 14. The wall 14 is typically a thin-walled construction, which can be metal, but also may be non-metal such as plastic. The surrounding wall 14 has an exterior surface 16 and an interior surface 18. The wall 14 is tubular in shape, and is often the shape of a cylinder defining an open interior volume 20. The surrounding wall 14, in the embodiment shown, has a first end 22 and an opposite second end 24.

The first end 22 of the wall 14 defines an open bottom 26. The open bottom 26 can connect to a collection bowl (not shown) for collecting any water separated from the fuel being filtered, as described further below. As can be seen in FIG. 3, the first end 22 of the wall 14 can be permanently (non-removably) secured to a first end cap 28. Many different ways of securing the wall 14 to the first end cap 28 are possible, and in the embodiment depicted, the wall 14 is bent or crimped in a U-shape over the first end cap 28 and clamped together.

The second end 24 of the wall 14 defines an open mouth 32. The open mouth 32 is typically in communication with a filter head (not shown) to allow for the inflow of fuel to be filtered and outflow of filtered fuel.

While many embodiments are possible, in the one depicted, the second end 24 of the wall 14 is non removably secured to an external sleeve 34. The sleeve 34, which is described further below, is used to removably attach the filter element 10 to a filter head.

The filter element 10 includes a section of filter media 36. The filter media 36 is located within the housing interior volume 20. In this embodiment, the filter media 36 is shaped in a tube and defines an open interior volume 38 therewithin. The cross-section of the tube may, in some embodiments be round or circular, while in other embodiments can be many shapes, e.g. non-round, including oval, rectangular with rounded corners ("scround"), racetrack, elliptical, square, regular polygon, irregular polygon, hexagonal, etc. The tube of filter media 36 can have a variety of overall shapes, including conical.

The filter media 36 is positioned to be upstream of other sections of filter media, as described further below. As such, the filter media 36 is referred to herein as a first section 40 of filter media. While, in the embodiment shown, the filter media 36 is the most upstream section of filter media, in other embodiments, there can be other sections of filter media located upstream of media 36, but still referring to the media 36 as the first section 40.

Many different embodiments of filter media 36 are possible. Typically, the first section 40 of filter media 36 is pleated media 42, such as pleated cellulous.

The filter element 10 optionally includes a layer of filter media 44 downstream of the first section 40. In optional embodiments that include filter media 44, the filter media 44 is next to and against the first section 40, and is along the interior volume 38 of the first section 40. In optional embodiments that include the filter media 44, together, the first section 40 and filter media 44 define an interior volume 39, which is radially inward of the filter media 44.

While many different embodiments are possible, in optional embodiments that include the filter media 44, the filter media 44 is coalescer filter media 46. The coalescer filter media 46 helps to remove water from the filtered fuel after passing through the first section 40. The coalescer filter media 46 can help to coalesce water into droplets such that the water droplets drain by gravity in a direction toward the open bottom 26.

In optional embodiments that include the filter media 44, the coalescer filter media 46 can be non-pleated or co-pleated with the first section 40.

As mentioned previously, the filter element 10 includes first end cap 28. The first end cap 28 is permanently secured to the first section 40 and the filter media 44, in embodiments that include the optional filter media 44. The first section 40 (and optional filter media 44) can be bonded to the first end cap 28, or it can be permanently secured in a variety of processes including potting or molding. The open bottom 26 is defined by a central opening 48 of the first end cap 28, and it provides communication with the interior volume 38.

The first end cap 28 can be made of a variety of materials including a nylon, molded plastics, or metal.

The first end cap 28 includes an internally directed section of threads 50. The threads 50 allow for removable attachment of the filter element 10 to a collection bowl for collecting water separated from the fuel.

The filter element 10 further includes an optional seal member 52 located between the first end cap 28 and the surrounding wall 14. The seal member 52 can be in the form of an O-ring seal member. In the embodiment shown, the first end cap 28 includes a seat 54 for the seal member 52 in the form of an indented section in the outer circumference of the first end cap 28. The surrounding wall 14 projects inwardly at projection 56 such that the seal member 52 is between and against the projection 56 and the seat 54. In other embodiments, there is no seal member 52 at this location, but instead, there can be an integral plastic seal or no seal at all but only a tortuous path to seal the water.

The filter element 10 further includes a second end cap 58. The second end cap 58 is located at an opposite end of the filter element 10 from the first end cap 28.

The first section 40 and optional filter media 44 of filter media is secured to the second end cap 58 permanently, such as by bonding, molding or potting. As can be seen in FIG. 3, the first section 40 and optional filter media 44 44 are both secured to the second end cap 58 and extend between the first end cap 28 and second end cap 58.

The second end cap 58 includes a barrier media 60. The barrier media 60 extends or projects into the interior volume 39. In the embodiment shown, the barrier media 60 is spaced from the optional filter media 44 filter media 44 and forms a tubular shape, which can have a variety of cross-sections, including, e.g., conical.

The second end cap 58 includes a media holding section 62, in which the first section and optional filter 44 are secured, and an axially projecting section 64. The axially projecting section 64 projects or extends in a direction toward the mouth 32 and away from the first section 40 and optional layer of filter media 44. The axially projecting section 64 is outside of the interior volume 39, but it is within the interior volume 20 of the wall 14.

The axially projecting section 64 includes a radial seal mount 66. The radial seal mount 66 is on the outer circumference of the axially projecting section 64 and hold a seal member 68 therewithin. The seal member 68 can be in the form of an O-ring. The seal member 68 is outside of the interior volume 39 of the first section 40 and optional filter media 44, but within the interior volume 20 of the housing 12.

In this embodiment, the pleated media 42 of the first section 40 includes inner pleat tips 70 and outer pleat tips 72. The seal member 68 is located to be radially spaced from the outer pleat tips 72. In the embodiment shown, the seal member 68 is radially spaced from the inner pleat tips 70. In most preferred embodiments, the seal member 68 is spaced between the outer pleat tips 72 and inner pleat tips 70.

As can be seen in FIG. 3, the second end cap 58 is within the interior volume 20 of the surrounding wall 14 and includes at least some portions 74 spaced from the interior surface 18 of the wall 14. There are spacers 76, projecting radially outwardly from the second end cap 58 that are located against the interior surface 18 of the wall 14. The spacers 76 help to hold the internal components in place within the housing 12, while the portions 74 allow for the input flow of fuel to be filtered to enter the filter element 10 and flow in the volume between the interior surface 18 of the wall 14 and the first section 40 of the filter media.

The second end cap 58 further includes a central opening 78. The central opening 78 is in communication with the interior volume 39 of the first section 40 and optional filter media 44 44. The central opening 78 is further in communication with an interior volume 80 of the barrier media 60.

Still in reference to FIG. 3, the barrier media 60 extends from the second end cap 58 into the interior volume 39 only partially toward the first end cap 28. That is, the barrier media 60 extends not more than part way from the second end cap 58 toward the first end cap 28. In many embodiments, this extension is between 40-70% of a length of the first section 40 from the second end cap 58 toward the first end cap 28. Typically, the barrier media 60 extends more than halfway of the length of the first section 40, but less than 80% of the length of the first section 40. In other typical examples, the barrier media 60 extends greater than 30%, and can be from 40-90%, and will typically be less than 95% of the total length between the first end cap 28 and second end cap 58.

The barrier media 60 includes an open end 82 at the second end cap 58 and an opposite end 84. As mentioned previously, the barrier media 60 is typically conically shaped such that the open end 82 is larger than the opposite end 84. The opposite end 84 can be a closed end, or it may be made from barrier media 60 and allow for some liquid to pass through.

While many embodiments are possible, one usable type of barrier media 60 includes a hydrophobic media.

Figure 4:
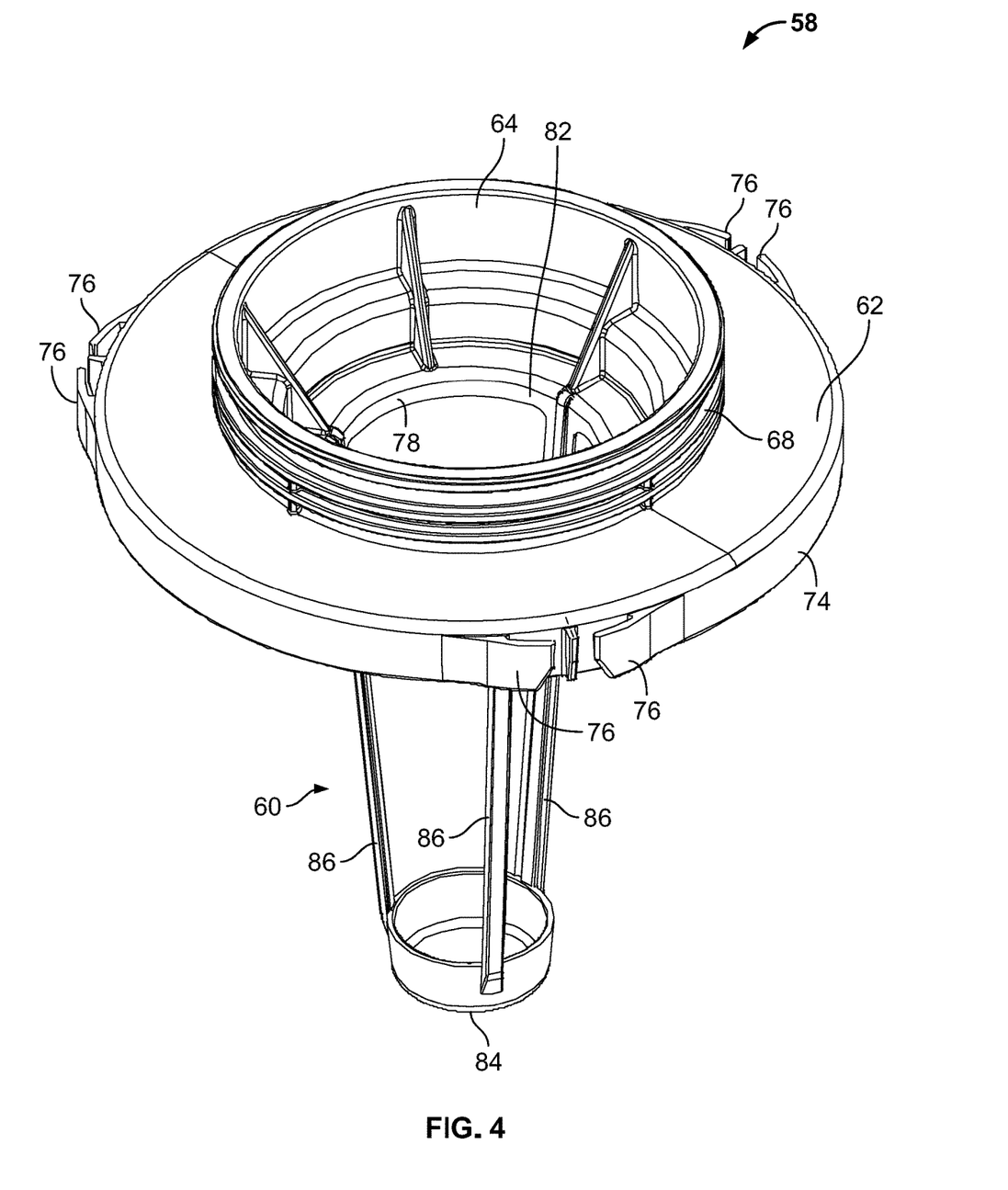
FIG. 4 is a perspective view of a portion of the filter element of FIG. 1, showing an end cap and barrier media used in the filter element of FIGS. 1-3.
Figure 5:
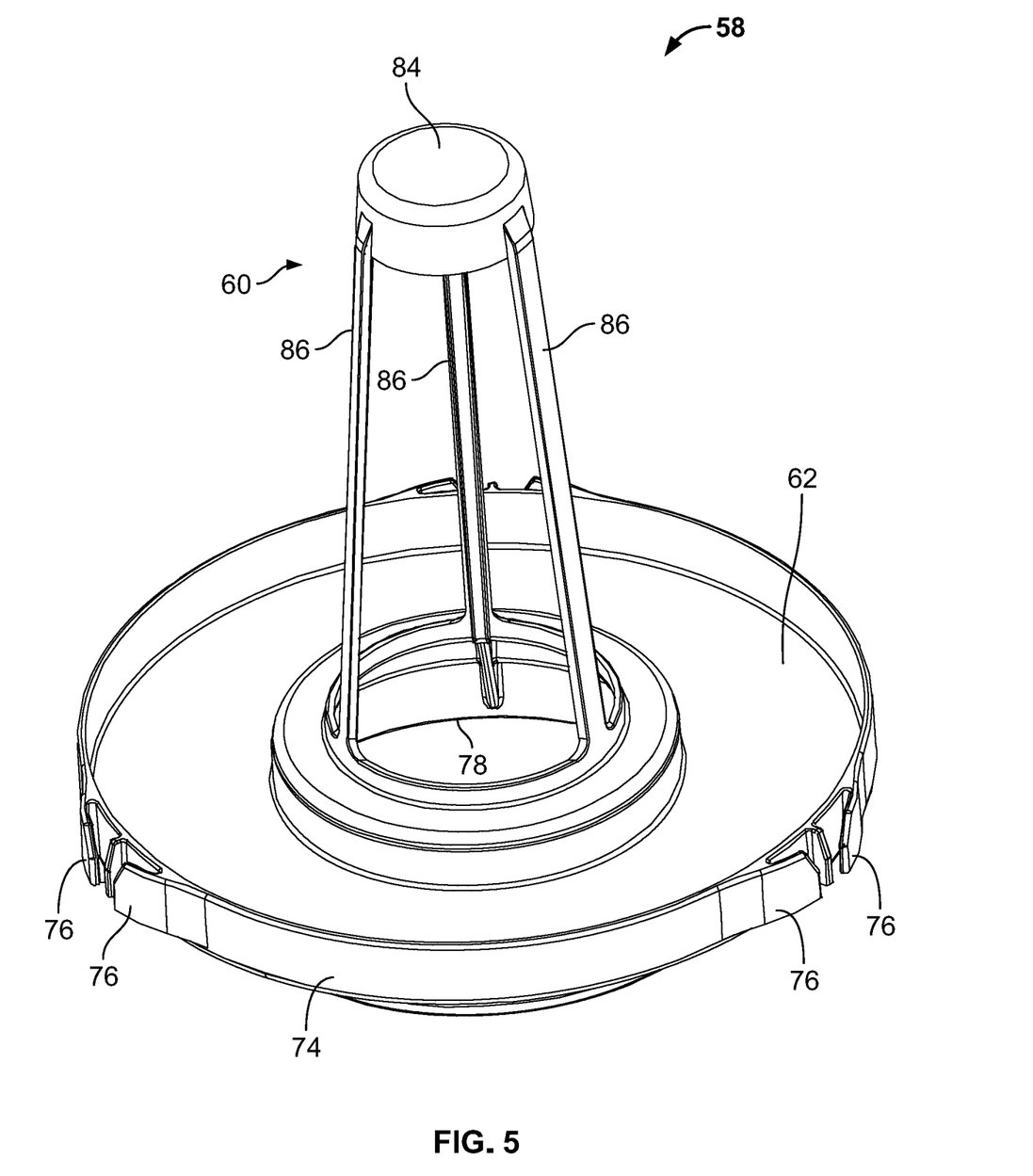
FIG. 5 is another perspective view of the end cap and barrier media of FIG. 4 used in the filter element of FIGS. 1-3.
Figure 6:
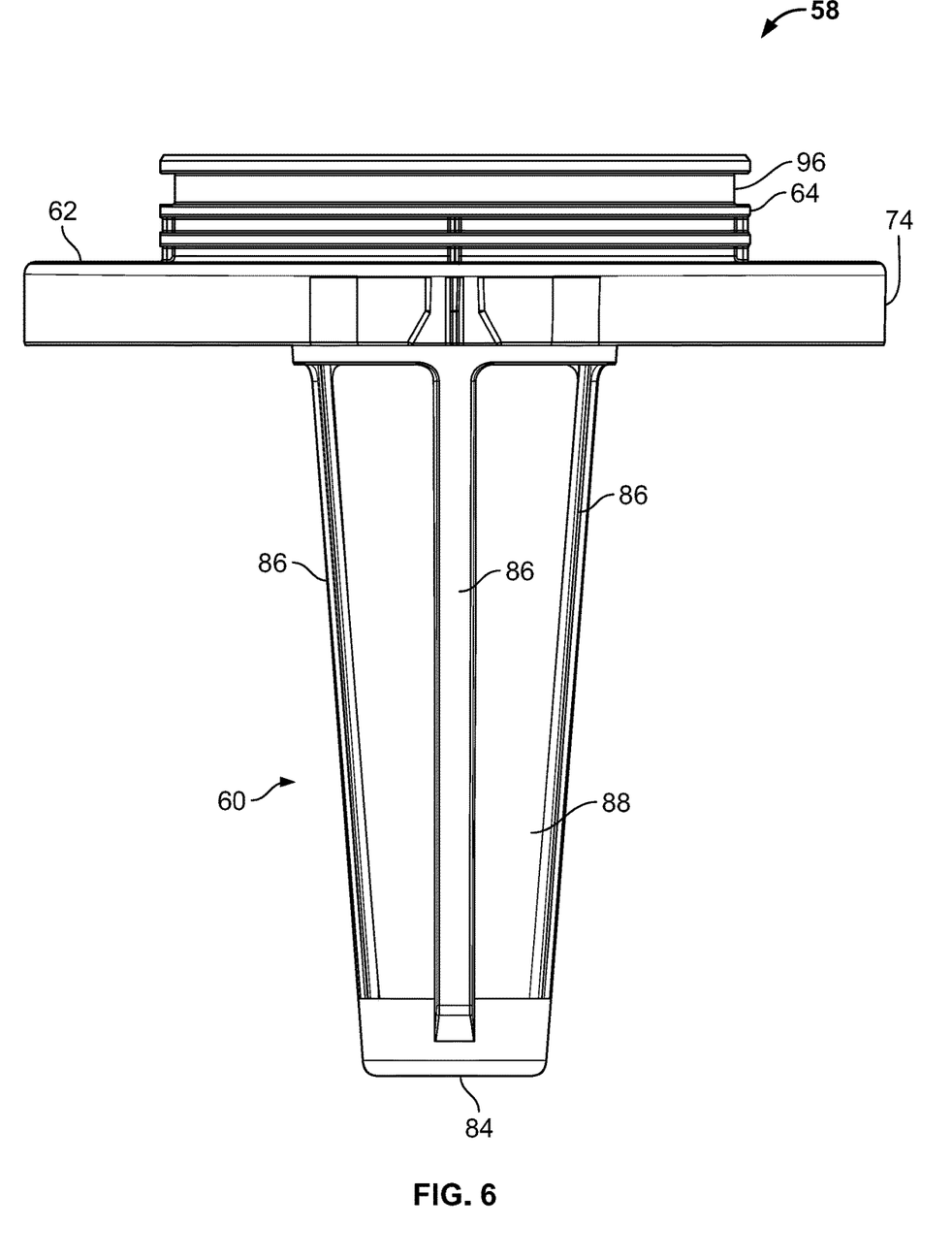
FIG. 6 is a front view of the end cap and barrier media of FIG. 4.

In reference now to FIGS. 4-6, further views of the second end cap 58 including the barrier media 60 are depicted. The barrier media 60 includes a plurality of support ribs 86 extending longitudinally between the open end 82 and the opposite end 84. The barrier media 60 is held by the ribs 86. The hydrophobic filter media for the barrier media 60 can be in the form of a hydrophobic screen 88 (FIG. 3). The screen 88 will help prevent water from passing to the interior volume 80 of the barrier media 60, but will promote the formation of water droplets along the exterior of the screen 88 so that they drip by gravity toward the open bottom 26.

As can be seen in FIGS. 5-6, the barrier media 60 is free of any cross ribs that extend along a circumference of the barrier media 60. In this embodiment, the only ribs 86 are the longitudinally extending ribs 86.

The barrier media 60 can be integrated with the second end cap 58, such that the second end cap 58 and barrier media 60 are molded together in a single piece.

Figure 7:
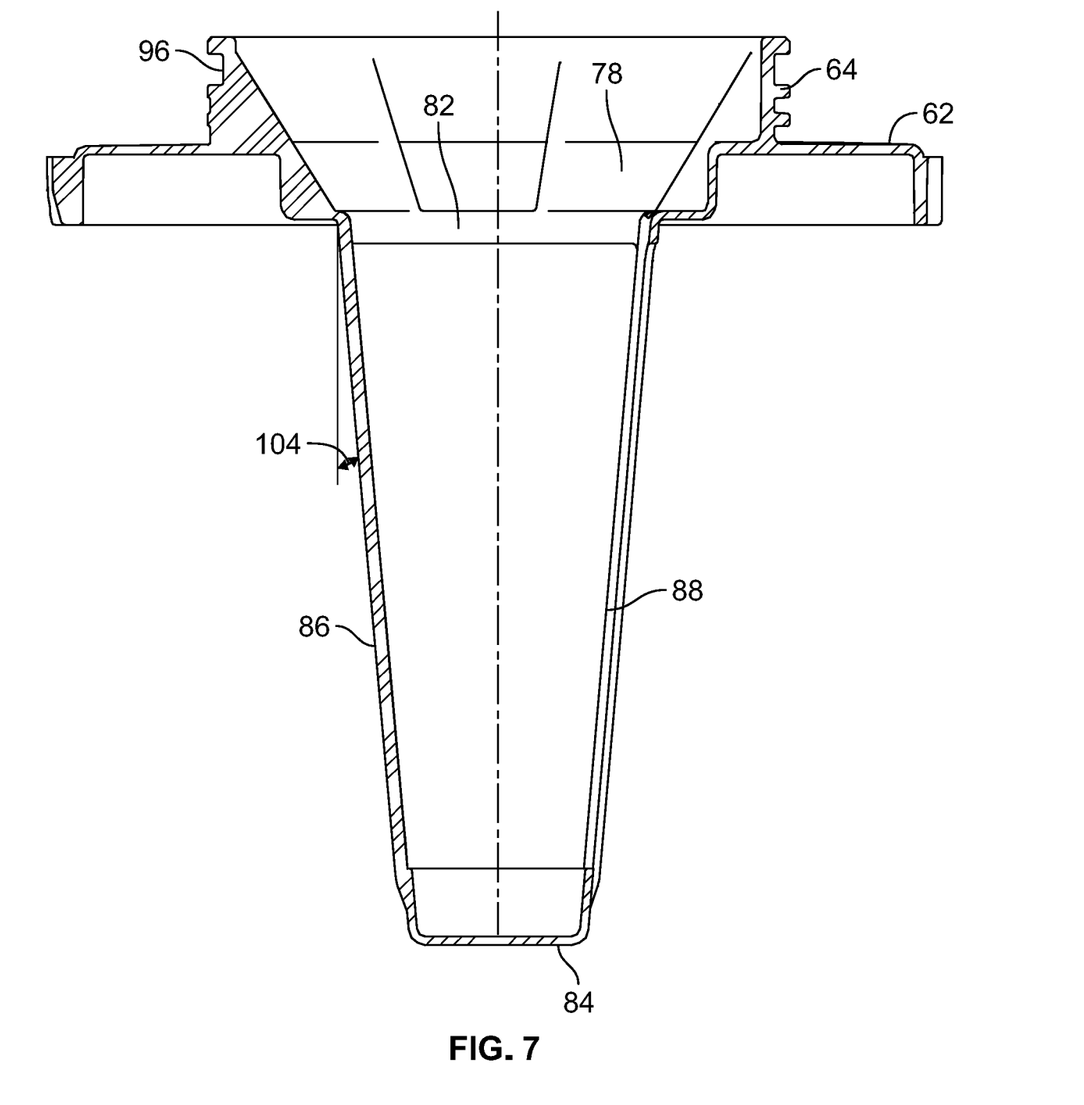
FIG. 7 is a cross-sectional view of the end cap and barrier media of FIGS. 5 and 6.

The barrier media 60 can have many cross-sectional shapes. In some examples, the open end 82 is larger than the opposite end 84. A draft angle 104 (FIG. 7) between the open end 82 of the barrier media 60 and the opposite end 84 can be between 1° and 20°, for example, between 5° and 15°. In other examples, the angle 104 can be between 20°-40°. In some examples, the barrier media 60 has a conical shape. A shape of the cross-sectional area of the media 60 can be round.

In many usable arrangements, the barrier media 60 has a cross-sectional area of media typically greater than the area of the second end cap orifice 89 (FIG. 3). Typical, usable embodiments will include the cross-sectional area of the barrier media 60 being at least greater than 2.5 times the area of the orifice 89. The second end cap orifice 89 forms part of a filtered liquid outlet for the element 10, in which the filtered liquid exits the element 10 therethrough. Other example ratios of the cross-sectional area of the barrier media 60 to the area of the second end cap orifice 89 include: 2.5 to 20; for example, 3 to 15; and in other examples, 5 to 10.

The barrier media 60, in some example embodiments, can be a screen or mesh material, but can be any type of hydrophobic material. The pore size can be typically 10-100 µm; typically 15-80 µm. The barrier media 60 can include both coated and uncoated materials and naturally hydrophobic or with hydrophobic properties.

In reference again to FIG. 3, and as mentioned previously, the filter element 10 includes sleeve 34. The sleeve 34 is around the exterior surface 16 of the surrounding wall 14. In many embodiments, the sleeve 34 is secured to the exterior surface 18 of the surrounding wall 14.

The sleeve 34, in the embodiment shown, has opposite first and second ends 90, 92. The second end 92 of the sleeve 34 is adjacent to the second end 24 of the surrounding wall 14. The first end 90 is spaced only part way along the surrounding wall 14 toward the first end 22 of the surrounding wall 14. In the embodiment shown, the length of the sleeve between the first end 90 and second end 92 is less than a third of a total length of the wall 14 between its opposite ends 22, 24. For example, in the embodiment shown in FIG. 3, the first end 90 of the sleeve 34 is within the first 25 percent of the wall 14 extending from the second end 24 toward the first end 22.

The sleeve 34 holds a gasket member 94. In the embodiment depicted, the sleeve 34 has an inwardly extending gasket seat 96 that holds the gasket member 94. The gasket member 94 forms an outwardly radially projecting seal member, which forms a seal between the filter element 10 and a filter 10 (not shown). The gasket member 94 is located adjacent the second end 24 of the wall 14. The wall 14, in this embodiment, is shown folded, crimped, or bent around the second end 92 of the sleeve 34 such that it extends into the gasket seat 96 to permanently connect the sleeve 34 and the wall 14.

The sleeve 34 further includes a threaded section 98. The threaded section 98 is for threadably connecting the filter element 10 to threads on the mating filter head. In the embodiment shown, the threaded section 98 is located between the gasket member 94 and the first end 90 of the sleeve 34.

The sleeve 34 also includes a stop flange 100. The stop flange 100 allows for bottoming out of the filter element 10 with the filter head, while connecting the threaded sections 98. The stop flange 100 is located axially between the threaded section 98 and the first end 90 of the sleeve 34.

Downstream, upstream, or both surfaces of one or more media used in the filter element 10 can be modified as described in application Ser. No. 62/375,772 filed Aug. 16, 2016 and the US utility application claiming priority from it having C00010029.WOU3, titled, "Hydrocarbon Fluid-Water Separation," incorporated herein by reference in its entirety. As described, the media can be ozone treated.

In operation, fuel to be filtered will enter the filter element 10 through the mouth 32 and pass through the gap between the portions 74 of the second end cap 58 and the interior surface 18 of the housing wall 14. The fuel then passes through the first section media 40, which removes contaminants and water. Tin embodiments that have the optional filter media 44, the fuel then passes through the filter media 44, which helps to further coalesce any water still within the fuel. The filtered fluid then enters into the interior volume 39 and passes through the screen 88 of the barrier media 60. The screen 60 helps to further remove any remaining water in the fuel by causing the water to collect along the exterior of the screen 88 and drip by gravity toward the open bottom 26 of the filter element 10. The fuel passes through the screen 88 of the barrier media 60 and exits through the open end 82 of the barrier media 60 and central opening 78 of the second end cap 58. The filtered fuel then exits the filter element 10 by passing into the filter head.

After a period of use, the filter element 10 will require servicing. The filter element 10 will be removed from the filter head, disposed of, and replaced with a new filter element 10.

Figure 9:
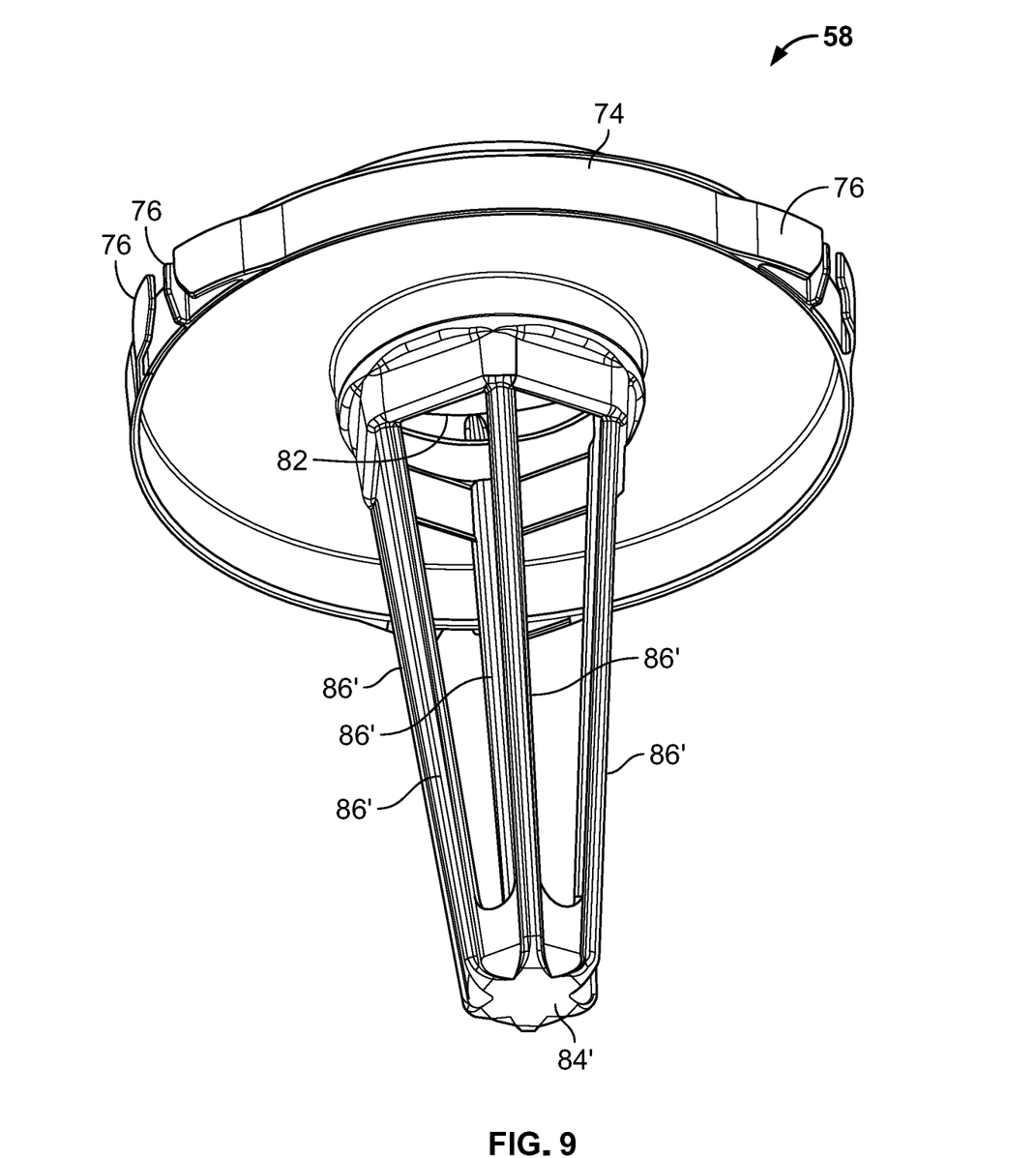
FIG. 9 a perspective view of an alternative embodiment of the end cap and barrier media usable in the filter element of FIGS. 1-3.
Figure 10:
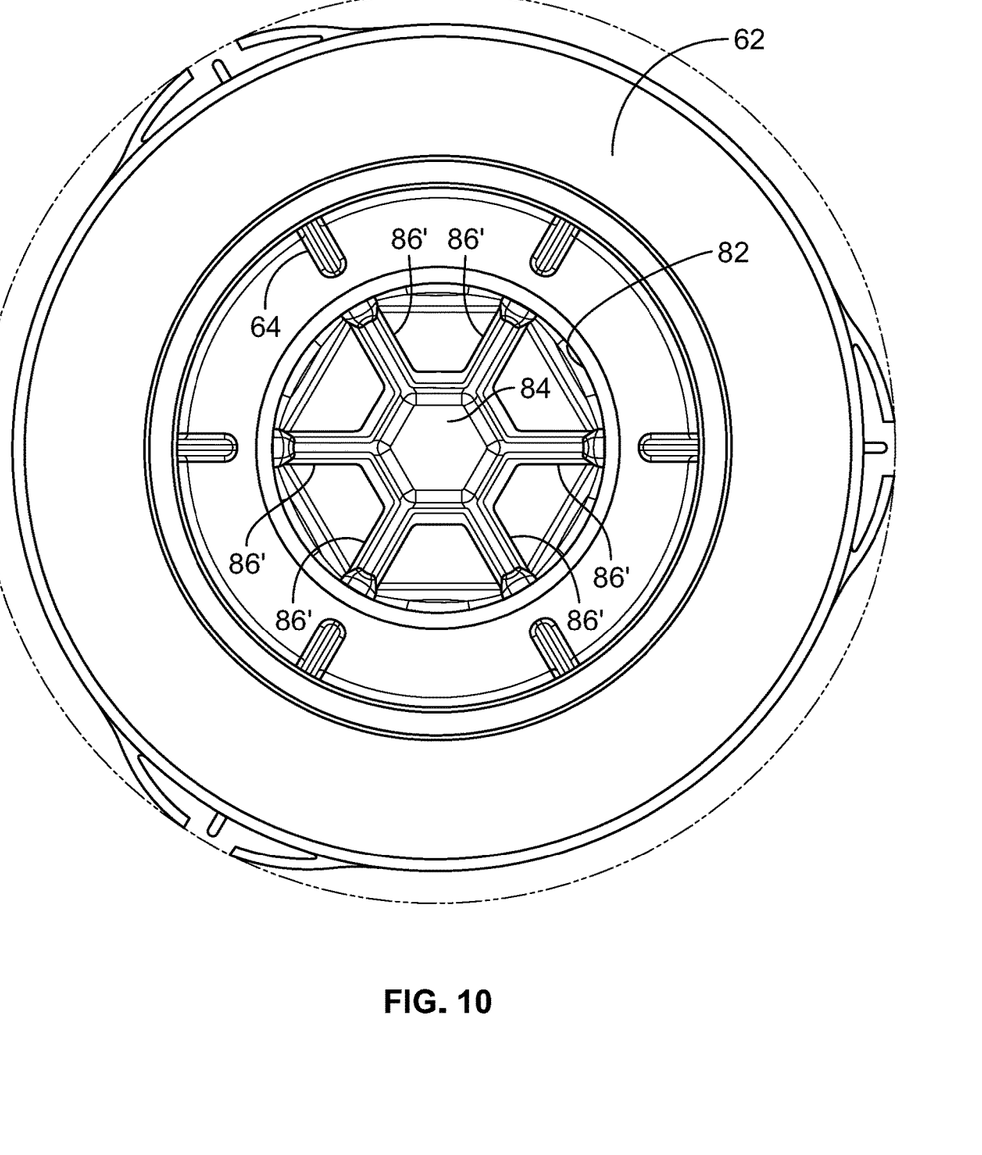
FIG. 10 is a top plan view of the end cap and barrier media of FIG. 9.

The Embodiment of FIGS. 9 and 10

In reference now to FIGS. 9 and 10, an alternative embodiment of the second end cap 58 including the barrier media 60 are depicted. Common reference numbers are used where the parts are the same as in the embodiment of FIGS. 4-6. The barrier media 60 includes a plurality of support ribs 86' extending longitudinally between the open end 82 and the opposite end 84'. The barrier media 60 is held by the ribs 86'. The hydrophobic filter media for the barrier media 60 can be in the form of hydrophobic screen 88 (FIG. 3). The screen 88 will help prevent water from passing to the interior volume 80 of the barrier media 60, but will promote the formation of water droplets along the exterior of the screen 88 so that they drip by gravity toward the open bottom 26.

The barrier media 60 is free of any cross ribs that extend along a circumference of the barrier media 60. In this embodiment, the only ribs 86' are the longitudinally extending ribs 86'.

In this embodiment, there are 6 ribs 86' with the media 60 extending between each rib 86'. The barrier media 60 can be integrated with the second end cap 58, such that the second end cap 58 and barrier media 60 are molded together in a single piece.

The barrier media 60 can have many cross-sectional shapes. In some examples, the open end 82 is larger than the opposite end 84. In many usable arrangements, the barrier media 60 has a cross-sectional shape that is tube-shaped, which includes both round (circular) and non-circular. While the embodiment of FIGS. 4-6 included the cross-sectional shape being round, in the embodiment of FIGS. 9 and 10, the cross-sectional shape is polygonal, including a regular polygon. In the one shown in the drawings, the cross-sectional shape is hexagonal, but could include other shapes such as rectangular, pentagonal, octagonal, etc.

When there are a plurality of the ribs 86', such as the six ribs 86' shown, the media 60 can be pulled taut or flat between the ribs 86', which is helpful in preventing water from passing into the interior volume 80. While more than six ribs 86' can be used, that introduces more non-filtering area; when less than six ribs 86' are used, the media 60 cannot be as flat. The depicted embodiment, with six ribs 86' forming the hexagonal cross-section shape for the media 60, is convenient and usable.

The above represents example principles. Many embodiments can be made using these principles.

We claim:

1. A filter element comprising:
(a) a housing including a surrounding wall defining a housing interior;
(b) a first section of filter media within the housing interior and shaped in a tube and defining an open interior volume therewithin;
(c) a first end cap secured to the first section of filter media; and
(d) a second end cap, at an opposite end of the filter element from the first end cap;
  (i) the second end cap defining a filtered liquid outlet;
  (ii) the first section of filter media being secured to the second end cap and extending between the first and second end caps;
  (iii) the second end cap including a barrier media arrangement having barrier media extending into the interior volume, spaced from the first section of media, and forming a tube;
    (A) the barrier media arrangement having an open end adjacent to the second end cap, and an opposite closed end; and the barrier media arrangement being larger at the open end than the closed end;
    (B) the barrier media arrangement including a plurality of support ribs extending longitudinally between the open end and closed end; and
    (C) wherein the second end cap and barrier media arrangement are molded together as a single piece.

2. The filter element of claim 1 wherein the barrier media extends from the second end cap into the interior volume not more than partway toward the first end cap.

3. The filter element of claim 1 wherein a draft angle between the open end of the barrier media arrangement and the closed end of the barrier media arrangement is between 1° and 20°.

4. The filter element of claim 3 wherein the barrier media arrangement has a conical shape; and wherein the barrier media has a cross-sectional shape that is round.

5. The filter element of claim 1 wherein the barrier media has a cross-sectional shape that is non-round including one of polygonal or hexagonal.

6. The filter element of claim 1 wherein the first section of filter media is pleated media; and the barrier media is hydrophobic filter media.

7. The filter element of claim 1 further including a layer of coalescer filter media downstream of the first section of filter media.

8. The filter element of claim 7 wherein the layer of coalescer filter media is next to and against the first section of filter media and is along the interior volume of the first section of filter media.

9. The filter element of claim 1 wherein the second end cap has a central opening in communication with the interior volume; the central opening being part of the filtered liquid outlet.

10. The filter element of claim 1 wherein the surrounding wall is permanently secured to the first end cap; and further comprising a seal member between the first end cap and the surrounding wall.

11. The filter element of claim 1 wherein the first end cap includes an internally directed section of threads; and the second end cap is within the surrounding wall and includes portions radially spaced from the surrounding wall.

12. The filter element of claim 1 wherein:
   (a) the first section of filter media is pleated with outer pleat tips and inner pleat tips; and
   (b) the second end cap includes a seal member outside of the interior volume and radially spaced from the outer pleat tips.

13. The filter element of claim 12 wherein the second end cap seal member is spaced between the outer pleat tips and inner pleat tips.

14. The filter element of claim 1 further including a sleeve secured to an exterior of the surrounding wall, adjacent the second end cap, and holding a gasket member; and wherein the sleeve includes a threaded section.

15. The filter element of claim 14 wherein:
   (a) the surrounding wall has a first end adjacent the first end cap and an opposite second end adjacent the second end cap;
   (b) the sleeve includes a second end adjacent the second end of the surrounding wall and an opposite first end spaced only partway along the surrounding wall toward the first end of the surrounding wall; and
   (c) the sleeve threaded section is axially between the first end of the sleeve and the gasket.

16. The filter element of claim 1 wherein the barrier media extends from the second end cap into the interior volume between 40-70% of a length of the first section of filter media toward the first end cap.

17. The filter element of claim 1 wherein:
   (a) the second end cap has a central opening in communication with the interior volume; and
   (b) a cross-sectional area of the barrier media is at least greater than 2.5 times a diameter of the central opening of the second end cap.

18. The filter element of claim 1 wherein the filter element is part of a spin-on filter assembly.

19. The filter element of claim 1 wherein the filter element is part of a bowl-cartridge assembly.

20. The filter element of claim 1 wherein the first section of filter media is ozone-treated.

* * * * *